US009074376B2

(12) United States Patent
Dustin

(10) Patent No.: US 9,074,376 B2
(45) Date of Patent: Jul. 7, 2015

(54) APPARATUS AND METHOD FOR DISPOSING OF ANIMAL WASTE DOWN A DRAIN

(71) Applicant: Brianal Innovations Corp., Surrey (CA)

(72) Inventor: Brian Kenneth Dustin, Surrey BC (CA)

(73) Assignee: Brianal Innovations Corp., Surrey (CA)

( * ) Notice: Subject to any disclaimer, the term of this patent is extended or adjusted under 35 U.S.C. 154(b) by 78 days.

(21) Appl. No.: 13/973,918

(22) Filed: Aug. 22, 2013

(65) Prior Publication Data

US 2015/0053139 A1   Feb. 26, 2015

(51) Int. Cl.
    *A01K 29/00*    (2006.01)
    *E04F 21/00*    (2006.01)
    *A01K 1/01*    (2006.01)

(52) U.S. Cl.
    CPC .. *E04F 21/00* (2013.01); *A01K 1/01* (2013.01)

(58) Field of Classification Search
    USPC .......................... 119/161–170; D30/161, 162
    See application file for complete search history.

(56) References Cited

U.S. PATENT DOCUMENTS

| | | | | |
|---|---|---|---|---|
| 1,813,329 | A | * | 7/1931 | Supplee ........................ 119/161 |
| 3,318,285 | A | * | 5/1967 | Betham ........................ 119/163 |
| 3,734,057 | A | * | 5/1973 | Lee et al. ...................... 119/163 |
| 3,771,491 | A | * | 11/1973 | Hunter ........................ 119/163 |
| 3,817,213 | A | * | 6/1974 | Chalmers ..................... 119/161 |
| 3,964,437 | A | | 6/1976 | Brown |
| 4,023,531 | A | | 5/1977 | Thompson |
| 4,196,693 | A | * | 4/1980 | Unversaw ..................... 119/164 |
| 4,242,763 | A | | 1/1981 | Walker |
| 4,432,498 | A | | 2/1984 | Clements |
| 4,660,506 | A | * | 4/1987 | Nalven ......................... 119/163 |
| 4,729,342 | A | * | 3/1988 | Loctin .......................... 119/163 |
| 4,957,131 | A | | 9/1990 | Robinson |
| 4,975,989 | A | * | 12/1990 | Sutton ............................. 4/300 |
| 5,003,920 | A | | 4/1991 | Miksitz |
| 5,070,820 | A | | 12/1991 | Gorman |
| 5,148,771 | A | * | 9/1992 | Schuett et al. ................ 119/479 |
| 5,996,533 | A | * | 12/1999 | Gordon ......................... 119/166 |
| 6,102,457 | A | | 8/2000 | Smith |
| 6,263,834 | B1 | * | 7/2001 | Igual De Valles ............. 119/166 |
| 6,453,844 | B1 | | 9/2002 | Janzen et al. |
| 6,792,628 | B1 | | 9/2004 | Humphrey |
| 7,121,228 | B1 | | 10/2006 | Klauber |
| 7,905,201 | B2 | | 3/2011 | Greene et al. |
| 8,337,381 | B2 | | 12/2012 | Tasara et al. |
| 2011/0315083 | A1 | | 12/2011 | Franklin |
| 2012/0073507 | A1 | | 3/2012 | Anderson |

FOREIGN PATENT DOCUMENTS

| | | | |
|---|---|---|---|
| CA | 1048339 | | 2/1979 |
| WO | WO 79/00458 | * | 7/1979 |

* cited by examiner

*Primary Examiner* — Andrea Valenti
(74) *Attorney, Agent, or Firm* — Mark A Hopkinson; Hopkinson Intellectual Property Law

(57) ABSTRACT

An apparatus for disposing of animal waste comprises a receptacle for receiving animal waste, a fixed screen within the receptacle for holding animal waste, and a drain for receiving animal waste. The drain is connected to a sanitary sewer. One or more spray nozzles flush animal waste through the fixed screen and into the drain. A controller mechanism controls the amount of water sent though the spray nozzle.

A method for animal waste disposal method comprises depositing animal waste onto a fixed screen in a receptacle, the receptacle comprising a drain and a spray nozzle for flushing the animal waste through the fixed screen and into the drain. A controller mechanism is actuated to control the amount of water sent through the spray nozzle and thereby flushing the animal waste down the drain.

20 Claims, 2 Drawing Sheets

APPARATUS AND METHOD FOR DISPOSING OF ANIMAL WASTE DOWN A DRAIN

TECHNICAL FIELD

This application relates to the field of disposal systems for animal waste, and particularly to preparing and flushing animal fecal matter down a drain.

CROSS REFERENCE TO RELATED APPLICATIONS

None.

GOVERNMENT SUPPORT

None.

BACKGROUND

Household pets such as dogs create fecal matter which can be a problem to dispose of properly. Some local governments prohibit the disposal of animal fecal matter in household garbage. It is common for government rules and regulations to require that pet owners pick up the fecal waste from their own pets which otherwise would be left on public property or the property of others. This leads to challenges for the pet owner to dispose of the pet's fecal matter.

If the pet owner has its own land, it may be possible to compost the fecal matter on the pet owner's property, however this solution may be smelly and is prohibited in certain jurisdictions. Another solution is to bring the pet fecal matter into the house and flush it down the toilet whereby it would enter the household sanitary waste system. This solution has the advantages that the pet waste would be treated in the same manner as human waste. However it may be an unpleasant experience for the pet owner. It may result in some animal fecal matter occasionally being spilled within the house. It may also be difficult to flush and may clog the toilet if the fecal matter is particularly large or dried.

There exists a need for a manner to dispose of pet animal fecal matter that complies with government regulations and easily and efficiently disposes of the fecal matter without requiring the fecal matter to enter the house.

SUMMARY OF INVENTION

An apparatus for disposing of animal waste is disclosed which comprises a receptacle for receiving animal waste, a fixed screen within the receptacle for holding animal waste, and a drain for receiving animal waste. The drain is connected to a sanitary sewer. One or more spray nozzles flush animal waste through the fixed screen and into the drain. A controller mechanism controls the amount of water sent though the spray nozzle.

A method for animal waste disposal is also disclosed, the method comprising depositing animal waste onto a fixed screen in a receptacle, the receptacle comprising a drain and a spray nozzle for flushing the animal waste through the fixed screen and into the drain. A controller mechanism is actuated to control the amount of water sent through the spray nozzle and thereby flushing the animal waste down the drain.

BRIEF DESCRIPTION OF DRAWINGS

In Figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
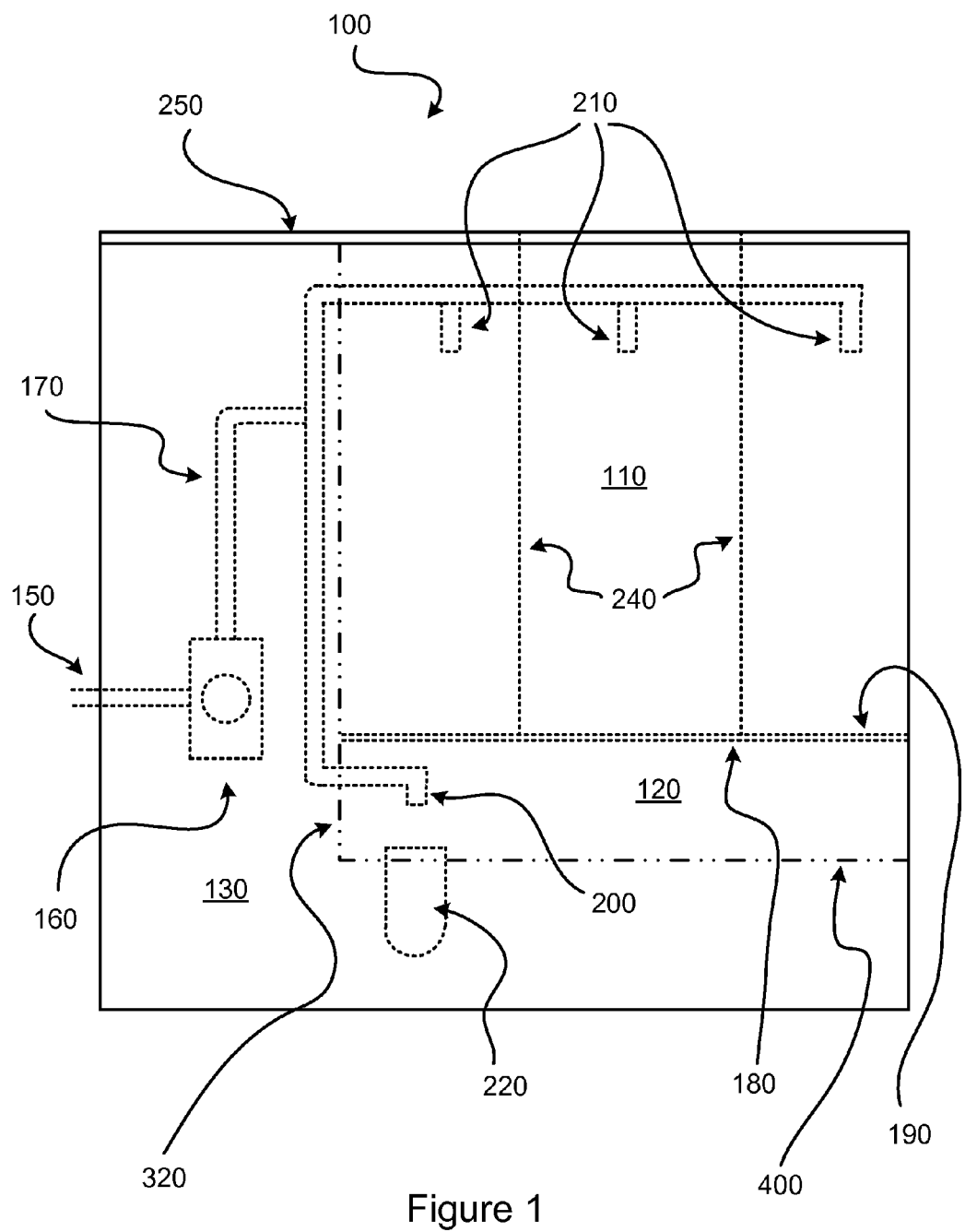
FIG. 1 is a front plan view of an embodiment of the invention.
Figure 2:
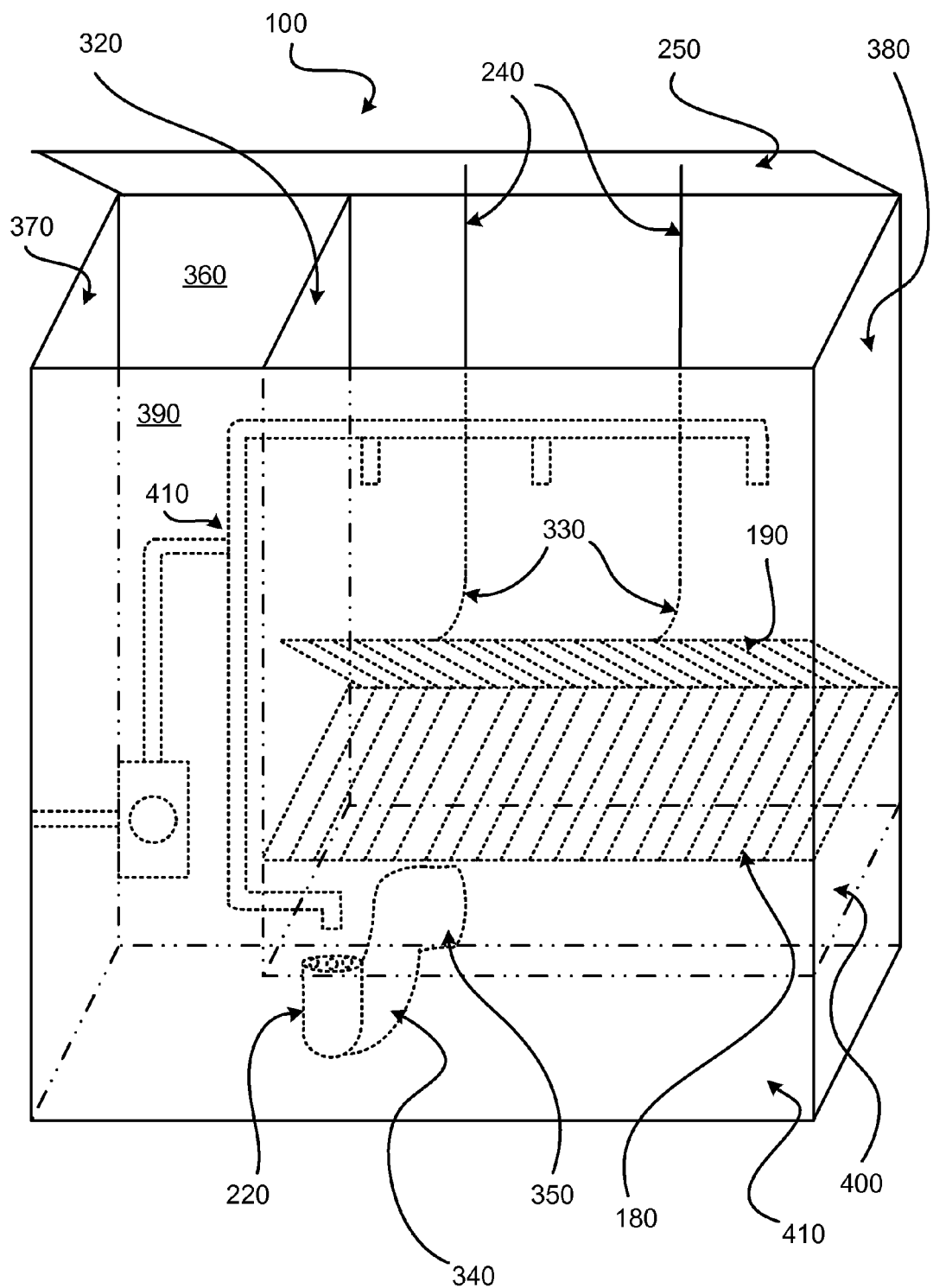
FIG. 2 is a perspective view of the embodiment of FIG. 1.

FIGS. 1 and 2 show an animal waste disposal system 100 designed primarily for the disposal of canine fecal matter.

The system 100 can be firmly attached to the outside structure of a building, such as a house, and may be affixed to studs such as those spaced 16 inches apart.

The system 100 comprises an outer housing including a back wall 360, a left side wall 370, a right side wall 380, a front wall 390, a hinged top lid 250 and an optional bottom floor wall 410. Partition wall 320 and partition floor 400 define a dry partition 130 and a wet partition comprising upper chamber 110 and lower chamber 120. The housing can be made of steel or rigid plastic or other suitable strong material. A fixed screen 180 separates the upper chamber 110 from the lower chamber 120. The top lid 250 may be equipped with a latch to secure it to the front wall 390.

In preferred embodiments as shown in FIGS. 1 and 2, an upper hinged screen 190 may be affixed to the top lid 250 via connecting rods 240 which may be designed with bends 330 therein.

Screens 180 and 190 may have a series of single wires arranged in parallel or may have a cross-hatched screen mesh or other suitable structure. Screen 180 is designed to receive the feces when the feces is deposited into the upper chamber 110 by a user, and the presence of screen 180 prevents overly large pieces of waste from entering and clogging the lower chamber 120.

In embodiments where screens 180 and 190 have wires running in parallel directions as shown in FIG. 2, in moving to a closed position the upper hinged screen 190 could pass below fixed screen 180, for example by about a half inch. Such an arrangement can assist in the slicing disintegration of waste deposited on the fixed screen 180.

A supply pipe 150 or hose connected to a water supply will bring water to the system 100, and specifically to control mechanism 160. Control mechanism 160 may control the water supply into the upper and lower chambers 110 and 120 by a specified period of time as a timer, or by a specified volume of water, and/or by actuation by a user.

Water is then fed from control mechanism 160 through piping 170 towards upper water nozzles or jets 210 and lower water jet 200. Upper water jets 210 can be provided in any suitable number, such as 1, 2, 3, 4, 5 or 6 to assist in the disintegration of fecal matter placed on screen 180. One or more lower water jets 210 may assist in washing fecal matter that has passed through screen 180 into drain 220 which may be equipped with a drain screen. One lower water lower water jet 200 may be located directly above the drain 220 to keep the drain flowing and clear of debris. One or more additional lower water jets could be positioned to help flush debris on the partition floor 400 towards the drain 220. Drain 220 has a trap 340 and exits the system 100 at drain exit 350 for connection to the household sanitary sewer.

Ready access to the control 160 in the dry partition 360 and its associated piping could be provided by adding openable portions of left side wall 370 or an openable section in front wall 390. Furthermore, access could be provided from underneath if bottom floor wall 410 is either not present or is removable.

In operation of an embodiment of the invention, water can enter the system 100 via direction connection from a house's main water supply or via connection with a garden hose. The lid 250 may be opened to deposit fecal matter on fixed screen 180. If the fecal matter is small enough or can be readily pushed through fixed screen 180 the fecal matter, with the potential help of upper hinged screen 190, can pass into the lower chamber 120 where it can be washed down into the drain 220. If the fecal matter is too large and dried-out then water spray from jets 210 and/or a soaking in water can soften up the waste until it can pass through fixed screen 180.

For use in colder climates, some or all of the invention may be heated. It may be particularly useful when the invention is mounted on the outside of a building in an area where temperatures approach or fall below freezing that the dry partition 130 be heated.

There are many alternatives to aspects of this invention.

The invention may be practiced without upper hinged screen 190 and the rods 240 that connect it to the lid 250. While the squeezing and/or slicing actions between the screens would not be available to assist in the disintegration of large dried waste, such an embodiment may be suitable for disposing of the waste of smaller pets.

Front wall 390 may have one or more bends in it to allow a wider top opening at the lid end than at the lower end to facilitate the entry of fecal matter. The lower chamber 120 may also be formed of different shapes which could include a sloped flat surface or a funnel-shaped portion which could direct waste and water into the drain 220 which in turn leads to a sanitary sewer system.

An electric valve 410 may be provided which can be controlled by control mechanism 160 and which selectively directs water to the upper spray jets 210 or the lower spray jet 200. In embodiments with an electric valve 410, the electric valve 410 may be housed in the dry portion 130 with only piping connecting to the upper and lower water jets 210 and 200 passing into the wet areas 110 and 120.

This invention has been described as a means to dispose of canine fecal matter but it is to be understood that it could also be used to dispose of other suitable waste such as waste from cats or other pets, or other organic waste that is not prohibited from entering into a building's sanitary waste system which may be a municipal sewer system, or septic tank, or local sewage treatment system.

As will be apparent to those skilled in the art in the light of the foregoing disclosure the present invention is not limited by what has been particularly shown and described herein. Rather the scope of the present invention includes both combinations and sub-combinations of the features described hereinabove as well as modifications and variations thereof which would occur to a person of skill in the art upon reading the foregoing description and which are not in the prior art. Furthermore, many alterations and modifications are possible in the practice of this invention without departing from the spirit or scope thereof. Accordingly, the scope of the invention is to be construed in accordance with the substance defined by the following claims.

What is claimed is:

1. Apparatus for disposing of animal waste comprising:
   a receptacle for receiving animal waste;
   a fixed screen within the receptacle for holding animal waste;
   a drain for receiving animal waste therein, the drain connected to a sanitary sewer;
   a spray nozzle for flushing animal waste through the fixed screen and into the drain;
   a controller mechanism for controlling a flow of water to the spray nozzle; and
   a hinged screen that is hingedly connected to the fixed screen and moveable from an open position to a closed position such that when in the closed position the hinged screen pushes animal waste through the fixed screen.

2. An apparatus as in claim 1, wherein the controller comprises a timer; the timer releasing the flow of water to the spray nozzle for a predetermined period of time, the spray nozzle spraying water onto animal waste placed on the fixed screen; thereby washing the animal waste through the fixed screen down the drain.

3. An apparatus as in claim 1, wherein the animal waste passing through the screen passes through a funnel-shaped portion into the drain.

4. An apparatus as in claim 3, wherein the spray nozzle is an upper spray nozzle above the fixed screen, further comprising a lower spray jet below the fixed screen for flushing animal waste into the drain.

5. An apparatus as in claim 4, further comprising a timer valve for selectively directing water to one or more of the upper spray nozzle and the lower spray jet.

6. An apparatus as in claim 5, wherein the controller mechanism is connected to a main building water supply and the sanitary sewer is a main building sewer system.

7. An apparatus as in claim 1, wherein said closed position of said hinged screen is below said fixed screen by about a half inch.

8. An apparatus as in claim 1, further comprising a top lid hingedly coupled to said receptacle.

9. An apparatus as in claim 8, wherein said hinged screen is affixed to said top lid via connecting rods.

10. An apparatus as in claim 9, said receptacle having a funnel-shaped portion for directing animal waste into said drain.

11. An apparatus as in claim 10, said receptacle having a wider top opening proximate said top lid.

12. An apparatus as in claim 11 wherein said animal waste is canine waste.

13. An apparatus as in claim 12 wherein the controller comprises a timer; the timer releasing the flow of water to the spray nozzle for a predetermined period of time, the spray nozzle spraying water onto animal waste placed on the fixed screen; thereby washing the animal waste through the fixed screen down the drain; the controller mechanism connected to a main building water supply and the sanitary sewer being a main building sewer system.

14. A method for animal waste disposal comprising:
   depositing animal waste onto a fixed screen in a receptacle, the receptacle comprising a drain and a spray nozzle for flushing the animal waste through the fixed screen and down the drain;
   closing a hinged screen onto the fixed screen to push animal waste through the fixed screen and towards the drain;
   actuating a controller mechanism to control the amount of water sent through the spray nozzle and thereby flushing the animal waste down the drain; and said drain connected to a sanitary sewer, said flushing the animal waste down the drain flushes the animal waste through said drain into said sanitary sewer.

15. The method of claim 14, wherein actuating a controller mechanism comprises closing a lid to the receptacle.

16. The method of claim 14, wherein actuating a controller mechanism comprises actuating a timer mechanism that releases water onto animal waste placed on the screen through the spray nozzle for a predetermined period of time.

17. The method of claim 14, said hinged screen coupled to a lid to the receptacle such that closing the hinged screen onto the fixed screen comprises closing the lid to the receptacle.

18. The method of claim 17, wherein actuating a controller mechanism comprises closing the lid to the receptacle.

19. The method of claim 17, wherein closing said hinged screen onto said fixed screen comprises passing said hinged screen below said fixed screen by about a half inch.

20. Apparatus for disposing of canine waste comprising:
a receptacle for receiving canine waste;
a fixed screen within the receptacle for holding canine waste;
a drain for receiving canine waste therein, the drain connected to a sanitary sewer;
said receptacle having a funnel-shaped portion for directing canine waste into said drain;
a spray nozzle for flushing canine waste through the fixed screen, through the funnel-shaped portion and into the drain;
a controller mechanism for controlling a flow of water to the spray nozzle;
a hinged screen that is hingedly connected to the fixed screen and moveable from an open position to a closed position such that when in the closed position the hinged screen pushes canine waste through the fixed screen;
a top lid hingedly coupled to said receptacle;
said hinged screen affixed to said top lid via connecting rods;
said receptacle having a wider top opening proximate said top lid; and
the controller mechanism configured for connection to a main building water supply.

* * * * *